(12) United States Patent
Lee

(10) Patent No.: US 6,409,920 B1
(45) Date of Patent: Jun. 25, 2002

(54) FILTER DEVICE HAVING A SIMPLIFIED CONFIGURATION

(76) Inventor: Tsung Hui Lee, P.O. Box 10-69, Chong Ho, Taipei (TW), 235

( * ) Notice: Subject to any disclaimer, the term of this patent is extended or adjusted under 35 U.S.C. 154(b) by 0 days.

(21) Appl. No.: 09/877,349

(22) Filed: Jun. 7, 2001

(51) Int. Cl.⁷ .......................... B01D 35/30; B01D 39/20
(52) U.S. Cl. ...................... 210/232; 210/314; 210/316; 210/444; 210/510.1
(58) Field of Search ................. 210/232, 314, 210/316, 444, 510.1

(56) References Cited

U.S. PATENT DOCUMENTS

| | | | | |
|---|---|---|---|---|
| 3,262,570 A | * | 7/1966 | Gailitis et al. | |
| 3,289,847 A | * | 12/1966 | Rothenund | |
| 4,540,489 A | * | 9/1985 | Barnard | |
| 5,024,764 A | * | 6/1991 | Holler | |
| 5,273,649 A | * | 12/1993 | Magnusson et al. | |
| 5,328,609 A | * | 7/1994 | Magnusson et al. | |

FOREIGN PATENT DOCUMENTS

GB          1072227    *   6/1967

* cited by examiner

*Primary Examiner*—Thomas M. Lithgow

(57) ABSTRACT

A filter device includes a cover secured on the upper portion of a filter housing and includes a water inlet and a water outlet. Two or more filter members are received in the filter housing and disposed between the water inlet and the water outlet of the cover for filtering the water. Various kind of filter members may thus be received in a single filter housing in order to form a simplified filter device. A pipe and a filter tube are received in the housing for receiving the filter members. A cap and a cup are secured on the filter tube for securing the tube in the housing.

6 Claims, 4 Drawing Sheets

FILTER DEVICE HAVING A SIMPLIFIED CONFIGURATION

BACKGROUND OF THE INVENTION

1. Field of the Invention

The present invention relates to a filter device, and more particularly to a filter device having a simplified and effect configuration.

2. Description of the Prior Art

Typical filter devices each comprise a single filter barrel disposed in a filter housing for filtering purposes. The users have to purchase or to assemble two or more filter devices together, including such as the primarily filter device, the secondary filter device, and one or more active carbon filter device, such that two or more filter housings are required to be coupled together in series.

The present invention has arisen to mitigate and/or obviate the afore-described disadvantages of the conventional filter devices.

SUMMARY OF THE INVENTION

The primary objective of the present invention is to provide a filter device including one or more different filter members received and arranged in a single filter housing in order to simplify the configuration filter device and in order to provide an effect filter device.

In accordance with one aspect of the invention, there is provided a filter device comprising a filter housing including a chamber formed therein, and including an upper portion, a cover attached on the upper portion of the filter housing and including a water inlet for receiving water and including a water outlet for allowing the water to flow out of the cover, and a first filter member and at least one second filter member received in the filter housing and disposed between the water inlet and the water outlet of the cover for filtering the water. Various kind of different filter members may thus be received and arranged in a single filter housing in order to simplify the configuration filter device and in order to provide an effect filter device.

A pipe is further provided and received in the filter housing for receiving the first filter member and at least one second filter member.

A filter tube is further provided and received in the filter housing and arranged between the water inlet and the water outlet of the cover for filtering the water from the water inlet of the cover, the pipe is received in the filter tube.

A cap is further provided and secured on the filter tube and including an orifice formed therein and defined by a duct, the pipe includes an end portion secured to the duct of the cap.

A device is further provided for positioning the filter tube in the filter housing and includes a peripheral channel formed in the cover and communicating with the water inlet of the cover, the filter tube includes a first end received in the peripheral channel of the cover and includes a second end.

The filter housing includes a bottom portion having a protrusion extended therefrom, the positioning means includes a cup attached to the second end of the filter tube and having a cavity formed therein for receiving the protrusion of the filter housing.

The cover includes a bore formed therein and communicating with the water outlet of the cover and the chamber of the filter housing for allowing the water to flow out of the water outlet of the cover via the bore of the cover.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
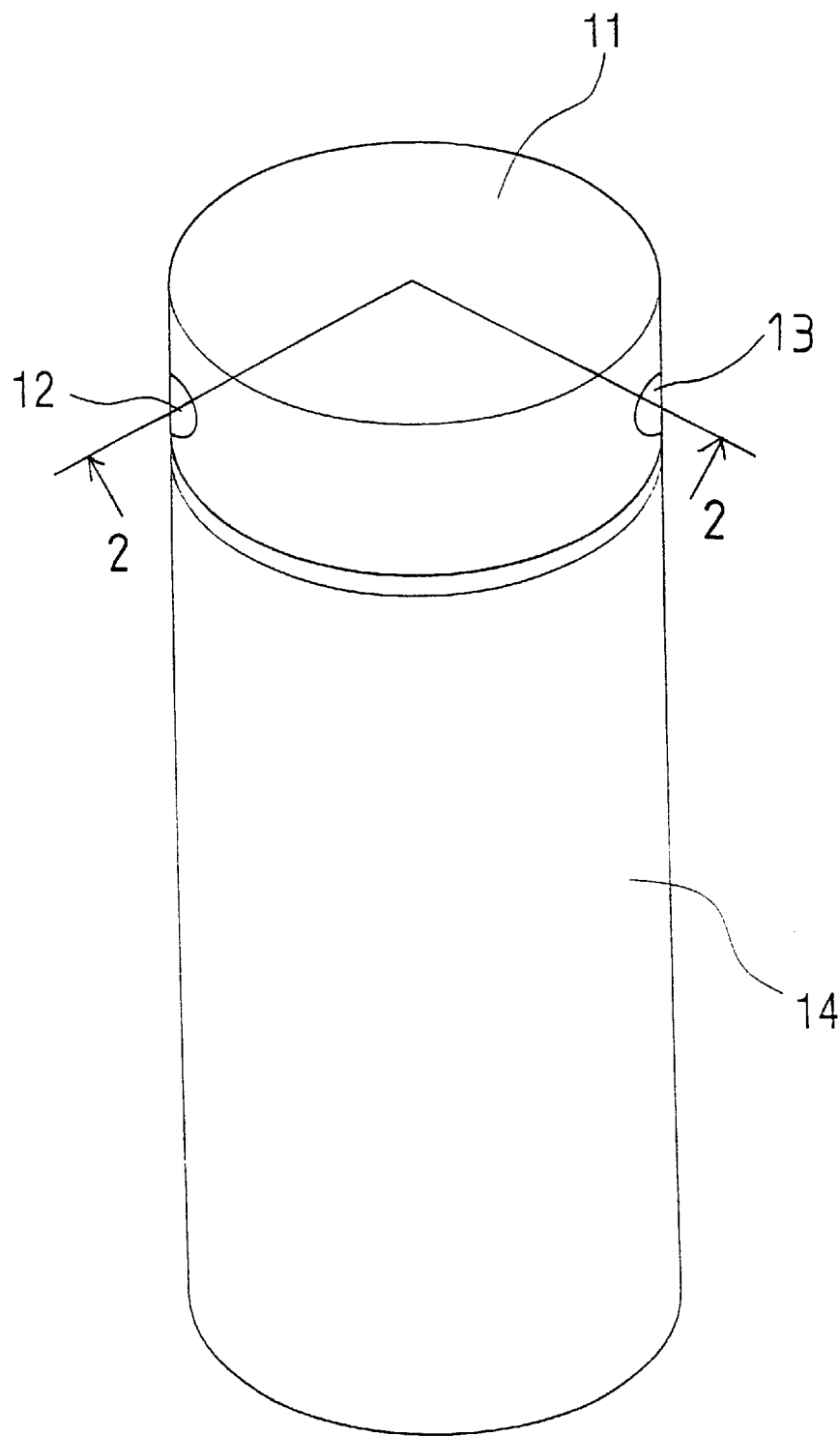
FIG. 1 is a perspective view of a filter device in accordance with the present invention.
Figure 2:
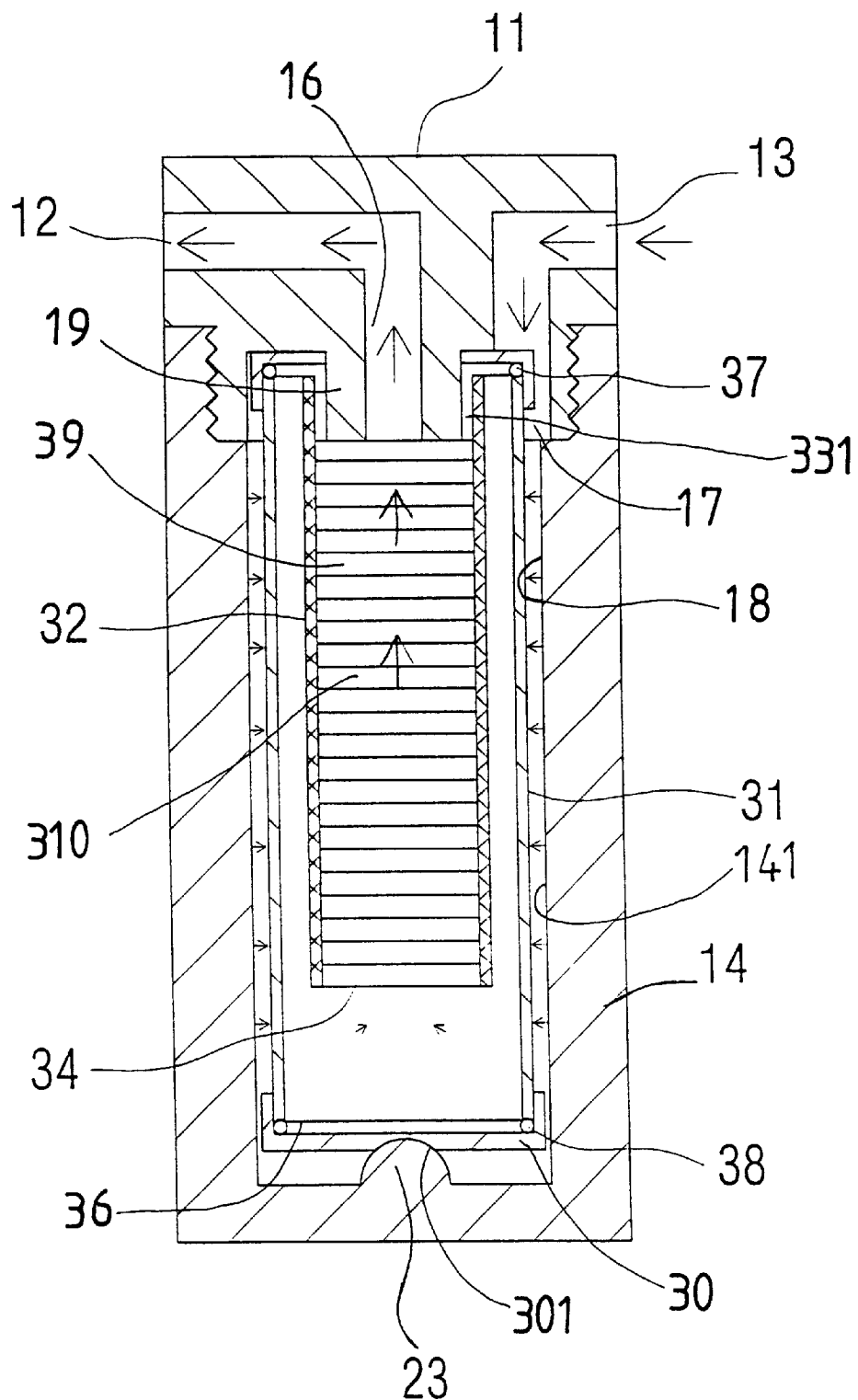
FIG. 2 is a cross sectional view taken along lines 2—2 of FIG. 1.
Figure 3:
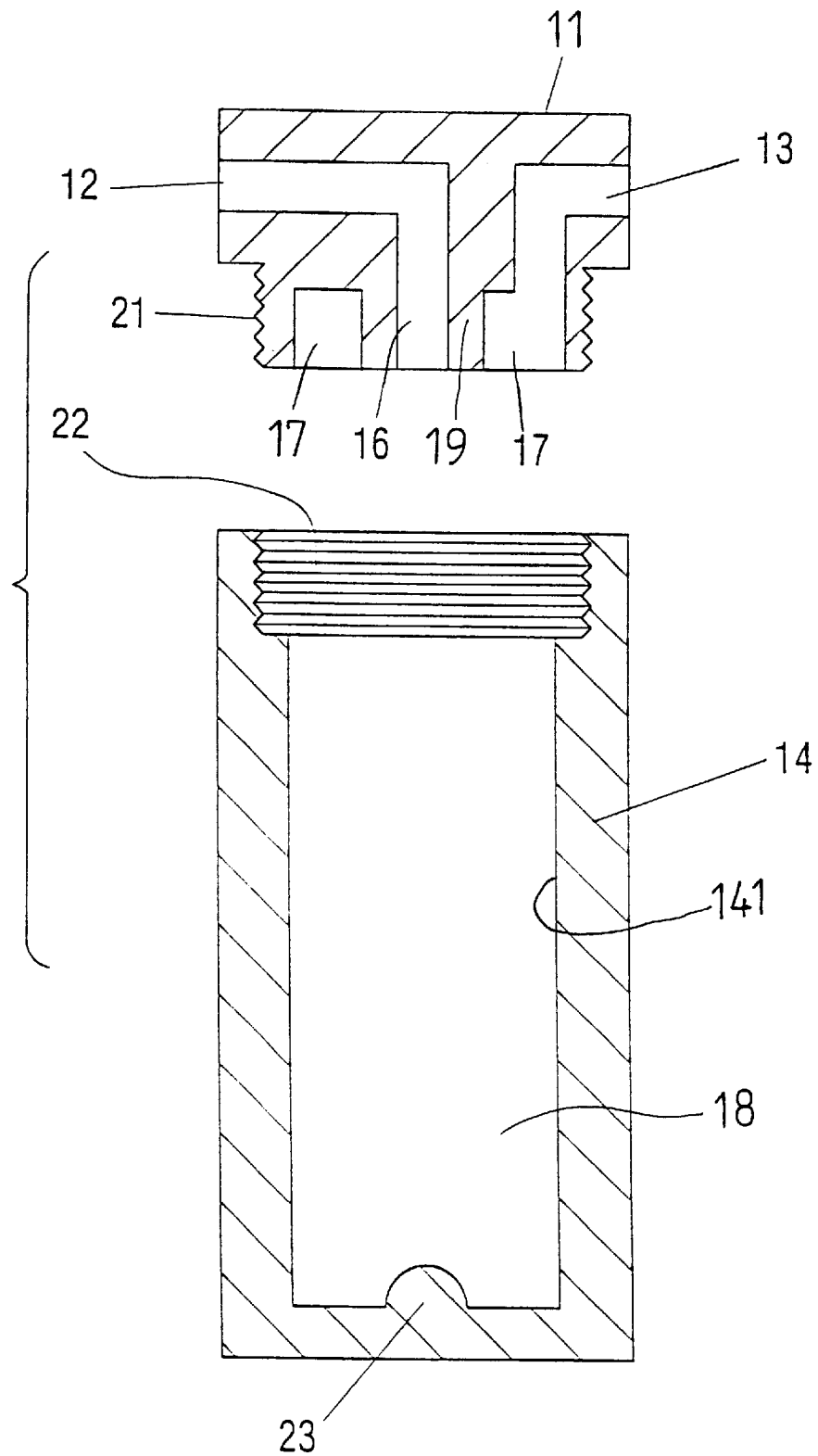
FIG. 3 is a partial exploded and cross sectional view showing the outer housing of the filter device.

Referring to the drawings, and initially to FIGS. 1–3, a filter device in accordance with the present invention comprises a cover 11 to be secured or attached on top of a filter housing 14. The cover 11 includes a water inlet 13 for coupling to the water reservoir and for receiving the water from the water reservoir, and includes a water outlet 12 for allowing the filtered water to flow out of the filter housing 14. As best shown in FIG. 3, the cover 11 includes a bore 16 formed therein and communicating with the water outlet 12, and includes a peripheral or circular channel 17 formed therein and communicating with the water inlet 13 for forming or defining a conduit 19 in the middle or center portion thereof. The cover 11 includes an outer thread 21 formed in the lower portion thereof.

The filter housing 14 includes a chamber 18 formed therein, and includes an inner thread 22 provided in the upper portion thereof for threading with the outer thread 21 of the cover 11 and for securing the cover 11 and the filter housing 14 together. The filter housing 14 includes a protrusion 23 extended upward and inward of the chamber 18 from the bottom thereof.

Figure 4:
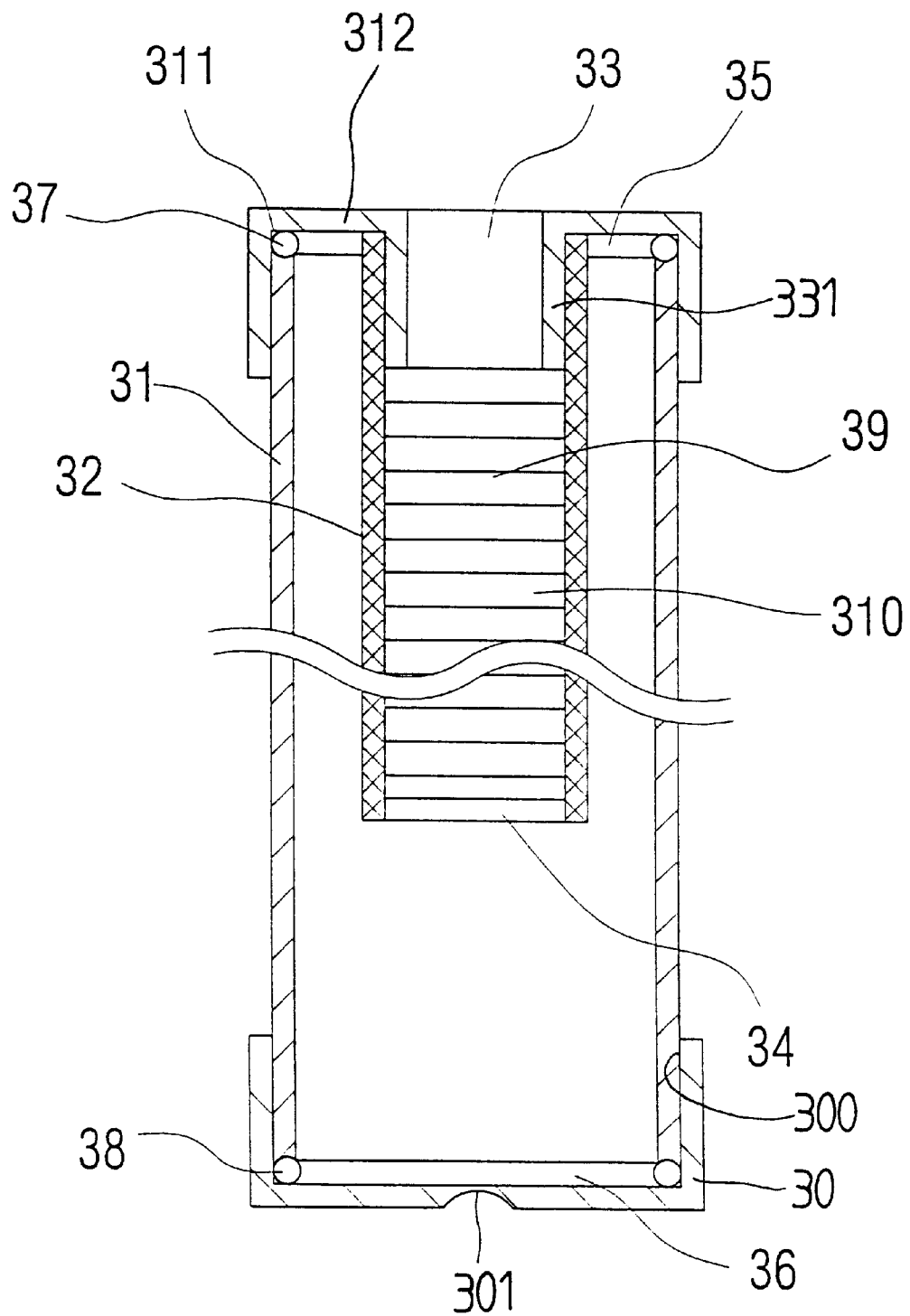
FIG. 4 is an enlarged partial cross sectional view illustrating the inner filter portion or parts of the filter device.

As shown in FIGS. 2 and 4, the filter device includes a filter tube 31, such as a porcelaneous filter tube 31 received in the chamber 18 of the filter housing 14, and having a lower portion engaged in a chamber 300 of a cup 30. A gasket 36 and/or a sealing ring 38 are engaged between the cup 30 and the bottom portion of the filter tube 31 for making a water tight seal therebetween. The cup 30 includes a cavity 301 formed in the bottom portion thereof for receiving the protrusion 23 of the filter housing 14 and for positioning the filter tube 31 within the filter housing 14.

A cap 312 includes a chamber 311 formed therein for receiving the upper portion of the filter tube 31. A gasket 35 and/or a sealing ring 37 are engaged between the cap 312 and the upper portion of the filter tube 31 for making a water tight seal therebetween. The cap 312 includes an orifice 33 formed in the middle portion thereof and formed or defined by a duct 331. The conduit 19 of the cover 11 may be engaged into the orifice 33 of the cap 312, and the cap 312 may be engaged into the peripheral channel 17 of the cover 11, such that the filter tube 31 may be positioned and secured in the chamber 18 of the filter housing 14 and may be spaced away from the inner peripheral surface 141 of the filter housing 14, such that the water from the water inlet 13 may flow into the chamber 18 of the filter housing 14 and may flow through the filter tube 31.

A pipe 32 has an upper portion secured to the duct 331 of the cap 312, by such as a force-fitted engagement or by adhesive materials, or by welding processes, and includes a lower inlet 34 for receiving the water that flows through the filter tube 31 and that flows into the filter tube 31. The upper portion of the pipe 32 may also be engaged or received in the peripheral channel 17 of the cover 11. One or more filter members 39, 310, such as the filter screens, the active carbon filter members, the nonwoven filter members, the ultra-filtering members, etc., are received and retained and secured in the pipe 32 and disposed between the lower inlet 34 of the pipe 32 and the orifice 33 of the cap 312, such that the water flowing into the pipe 32 may be filtered by the filter members 39, 310 and may then flow out through the water outlet 12 via the orifice 33 of the cap 312.

It is to be noted that various kinds of filter members 39, 310, such as the filter screens, the active carbon filter members, the nonwoven filter members, the ultra-filtering members, etc., may be received in a single filter housing 14, such that the filter device includes a simplified configuration that may be easily assembled by the users.

Accordingly, the filter device in accordance with the present invention includes one or more different filter members received and arranged in a single filter housing in order to simplify the configuration filter device and in order to provide an effect filter device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A filter device comprising:

a filter housing including a chamber formed therein, and including an upper portion, a cover attached on said upper portion of said filter housing and including a water inlet for receiving water and including a water outlet for allowing the water to flow out of said cover, a first filter member and at least one second filter member received in said filter housing and disposed between said water inlet and said water outlet of said cover for filtering the water, a pipe received in said filter housing for receiving said first filter member and at least one second filter member, and a filter tube received in said filter housing and arranged between said water inlet and said water outlet of said cover for filtering the water from said water inlet of said cover, said pipe being received in said filter tube, and said filter tube being a porcelaneous filter tube.

2. The filter device according to claim 1 further comprising a cap secured on said filter tube and including an orifice formed therein and defined by a duct, said pipe including an end portion secured to said duct of said cap.

3. The filter device according to claim 1 further comprising means for positioning said filter tube in said filter housing.

4. The filter device according to claim 3, wherein said positioning means includes a peripheral channel formed in said cover and communicating with said water inlet of said cover, said filter tube includes a first end received in said peripheral channel of said cover and includes a second end.

5. The filter device according to claim 4, wherein said filter housing includes a bottom portion having a protrusion extended therefrom, said positioning means includes a cup attached to said second end of said filter tube and having a cavity formed therein for receiving said protrusion of said filter housing.

6. The filter device according to claim 1, wherein said cover includes a bore formed therein and communicating with said water outlet of said cover and said chamber of said filter housing for allowing the water to flow out of said water outlet of said cover via said bore of said cover.

* * * * *